United States Patent
Holder et al.

(10) Patent No.: US 6,571,748 B2
(45) Date of Patent: Jun. 3, 2003

(54) FUEL SUPPLY SYSTEM

(75) Inventors: Eberhard Holder, Kusterdingen (DE); Roland Kemmler, Stuttgart (DE); Martin Matt, Bruchsal (DE); Viktor Pfeffer, Ostfildern (DE); Carsten Plog, Markdorf (DE); Thomas Stengel, Friedrichshafen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/016,814

(22) Filed: Dec. 13, 2001

(65) Prior Publication Data

US 2002/0056441 A1 May 16, 2002

Related U.S. Application Data

(63) Continuation-in-part of application No. PCT/EP00/04268, filed on May 11, 2000.

(30) Foreign Application Priority Data

Jun. 15, 1999 (DE) .......................... 199 27 176

(51) Int. Cl.$^7$ ................................ F02B 43/08
(52) U.S. Cl. ........................... 123/3; 123/575
(58) Field of Search ............... 123/3, 575, 576

(56) References Cited

U.S. PATENT DOCUMENTS

| | | | |
|---|---|---|---|
| 3,807,377 A | 4/1974 | Hirschler, Jr. et al. | 123/575 |
| 4,876,989 A | 10/1989 | Karpuk et al. | 123/3 |
| 5,357,098 A | * 10/1994 | Sung et al. | 123/3 |

FOREIGN PATENT DOCUMENTS

| | | |
|---|---|---|
| DE | 197 34 493 | 11/1998 |
| EP | 0 060 976 | 9/1982 |
| GB | 2 209 796 | 5/1989 |
| GB | 2 330 176 | 4/1999 |

* cited by examiner

*Primary Examiner*—Noah P. Kamen
(74) *Attorney, Agent, or Firm*—Klaus J. Bach

(57) ABSTRACT

In a fuel supply system for an internal combustion engine having a fuel tank for liquid fuel, a fuel pump which draws fuel from the fuel tank and pressurized the fuel to an injection pressure at which the fuel is made available to the internal combustion engine, a fuel-fractionating device which produces at least one liquid fuel fraction from the fuel, and an accumulator which receives the liquid fuel fraction from the fuel-fractionating device, stores it and makes it available to the internal combustion engine, the fuel fraction made available and the fuel made available being fed to the internal combustion engine by the fuel supply system as a function of demand, the accumulator is a pressure accumulator and includes pressure-generating means for pressurizing fuel fraction in the pressure accumulator to the injection pressure.

25 Claims, 3 Drawing Sheets

FUEL SUPPLY SYSTEM

This is a Continuation-In-Part application of International application PCT/EP00/04268 filed May 11, 2000, and claiming the priority of German application 199 27 176.3 filed Jun. 15, 1999.

BACKGROUND OF THE INVENTION

The invention relates to a fuel supply system for an internal combustion engine comprising a fuel tank, a fuel pump supplying the fuel from the tank under pressure to the engine and a fuel processing unit, in which at least two fuel fractions are produced which are supplied to the engine depending on the engine operating conditions, and to a method of supplying fuel and the fuel fractions to an internal combustion engine.

The fuels currently available for operating internal combustion engines, e.g. for motor vehicles such as trucks, passenger cars, buses, constitute a compromise between, on the one hand, restrictions on the part of the fuel manufacturers, e.g. on account of different crude oil grades, manufacturing processes, costs and energy input, and, on the other hand, partly conflicting requirements with respect to the internal combustion engines, such as, for example, reliable cold starting even at extremely low temperatures, low exhaust-gas and evaporative emissions, low consumption, high knock rating even in super-charged engines, prevention of deposits, avoidance of corrosion, low sulphur content, smooth engine running and a high degree of safety. In order to be able to adapt the existing fuels to the requirements of the internal combustion engine more effectively, fuel supply systems of the type mentioned at the beginning are used.

For example, GB 2 209 796 A discloses a fuel-fractionating device which is connected to a fuel tank and separates fractions of different quality from the fuel. These fuel fractions are stored in separate fuel tanks, which are connected to an internal combustion engine via separate fuel lines. One fuel tank is heated by the exhaust gases of the internal combustion engine by means of a heating line. Arranged in the fuel lines are valves which regulate the fuel quality of the fuel fed to the internal combustion engine as a function of the operating state of the internal combustion engine and/or as a function of the fill level of the fuel tank. A microprocessor may be provided in order to regulate a fuel injection system, the quality of the fed fuel and the ignition timing.

DE 197 34 493 C1 discloses a fuel supply system of the type mentioned at the beginning which has a fuel tank for liquid fuel. In addition, a fuel-fractionating device is provided which, on the inlet side, receives the fuel from the fuel tank and produces therefrom a low-boiling fuel fraction and a higher-boiling fuel fraction. The fuel supply system includes a separate accumulator for each fuel fraction. These accumulators receive the respective liquid fuel fraction from the fuel-fractionating device, store them and make them available to the internal combustion engine. Furthermore, the fuel supply system has a main fuel pump which, on the suction side, is connected, via a switchover valve, either to the fuel tank containing the fuel or to the accumulator containing the higher-boiling fuel fraction. On the pressure side, the fuel pump is connected to a first inlet of a switchover valve. Connected to the second inlet of this switchover valve is the pressure side of an auxiliary fuel pump, which is connected on the suction side to the accumulator containing the low-boiling fuel fraction. The outlet side of the switchover valve is connected to the internal combustion engine. In order to be able to make both, the fuel and the individual fuel fractions, available to the internal combustion engine at the injection pressure, two separate fuel pumps are used. However, such a setup is relatively complicated and expensive.

EP 0 060 976 A1 discloses a fuel supply system for an internal combustion engine, wherein a fuel pump receives fuel from a fuel tank and supplies the fuel on one hand to an injection valve and, on the other, to a processing apparatus. In the processing apparatus, a low boiling fuel fraction is evaporated and the fuel vapors are then condensed. The condensed fuel fraction is supplied to an auxiliary tank, which is also in communication with the injection valve. During startup of the engine, the fuel fraction of the auxiliary tank is supplied to the engine. Since the fuel line system is a closed system, the injection pressure is also present in the auxiliary tank.

GB 2 330 176 A discloses a fuel supply system, wherein the fuel from the fuel tank is supplied by a first pump to an evaporator unit. In the evaporator unit, a low boiling fuel fraction is evaporated. The higher boiling remaining fuel fraction is supplied, during normal engine operation to the internal combustion engine by means of a second fuel pump. A third fuel pump supplies the evaporated lower boiling fuel fraction to a condenser in the form of a pressure storage container wherein the fuel vapors are condensed. The low boiling fuel fraction is subjected in this pressure storage container to a higher injection pressure than the higher boiling fuel fraction. For startup of the engine, the low boiling fuel fraction is supplied to the engine.

The present invention deals with the problem of reducing the cost, which is required in order to make the fuel fraction and the fuel available to the internal combustion engine at the same pressure.

SUMMARY OF THE INVENTION

In a fuel supply system for an internal combustion engine having a fuel tank for liquid fuel, a fuel pump which draws fuel from the fuel tank and pressurized the fuel to an injection pressure at which the fuel is made available to the internal combustion engine, a fuel-fractionating device which produces at least one liquid fuel fraction from the fuel, and an accumulator which receives the liquid fuel fraction from the fuel-fractionating device, stores it and makes it available to the internal combustion engine, the fuel fraction made available and the fuel made available being fed to the internal combustion engine by the fuel supply system as a function of demand, the accumulator is a pressure accumulator and includes pressure-generating means for pressurizing fuel fraction in the pressure accumulator to the injection pressure.

Due to the accumulator being designed as a pressure accumulator, the fuel fraction contained therein can be pressurized to the fuel injection pressure. In this way, less complicated pressure-generating means can be used for generating the injection pressure. In particular, pressure-generating means, which are already present in the internal combustion engine or in its peripheral area, may be used.

In accordance with the invention, a bellows is arranged in the pressure accumulator, which is connected to a pressure source, preferably to the already existing fuel pump, which can apply the injection pressure to the accumulator. Since the fuel pump delivers the injection pressure anyway, no additional measures need be taken in such an embodiment.

In an alternative embodiment, the fuel-processing or fractionating apparatus includes a vapor pump, which is connected with its suction side to an evaporation region and with its pressure side to a condensation region. In such an embodiment, the existing vapor pump is expediently used for generating the injection pressure and is connected in an appropriate manner to the pressure accumulator. In this embodiment, too, no additional, complicated measures are required.

In accordance with an especially advantageous embodiment, a condensation chamber of the fuel-processing apparatus forms the accumulator or the pressure accumulator. This means that this condensation chamber is dimensioned not only for a condensation pressure but also for the injection pressure. In addition, due to the condensation chamber being designed as an accumulator, additional lines and the sealing problems associated therewith are avoided.

In another advantageous embodiment of a fuel supply system of the type mentioned at the beginning, a condensation chamber of the fuel-fractionating device may be of cylindrical, in particular circular-cylindrical, design, whereas an evaporation chamber of the fuel-fractionating device is of annular design and is arranged concentrically and coaxially to the condensation chamber and annularly encloses the latter. This design of condensation chamber and evaporation chamber results in an especially favorable heat exchange between the chambers, so that an external heat supply for assisting the evaporation in the evaporation chamber may not be needed. Corresponding cooling of the condensation chamber may likewise be omitted.

The problem underlying the invention is also solved by a method which is based on the general concept of applying the injection pressure to the stored fuel fraction in its accumulator in order to prepare both the fuel fraction and the unfractionated fuel at the pressure level of the fuel for injection into the internal combustion engine.

In the method according to the invention, the accumulator which serves to store the fuel fraction serves as a condensation chamber of a fuel-processing apparatus which includes a vapor pump connected at the suction side to an evaporation chamber containing liquid fuel and at the vapor side to the condensation chamber, that is the accumulator. This measure results in a further simplification, since additional transport lines between the condensation chamber and the accumulator may be dispensed with. The pressure in the accumulator during the fractionating operation may be smaller than the injection pressure. With such a procedure, the vapor pump of the fuel-fractionating device may be dimensioned to be relatively small. In addition, the fractionating operation then requires less energy.

The evaporation chamber of the fuel-fractionating device may be filled with liquid fuel before the fractionating operation. A vapor space sufficient for the fractionating operation is however retained. The evaporation chamber is preferably filled with liquid fuel by generating a vacuum in the evaporation chamber, the evaporation chamber being connected to the fuel tank, so that the fuel is drawn out of the fuel tank into the evaporation chamber. With this procedure, the vapor pump, which is present anyway, may at the same time be used for delivering the liquid fuel from the fuel tank into the evaporation chamber.

Especially advantageous is an embodiment in which a flushing operation is carried out during the filling of the evaporation chamber with fuel. By the flushing operation the liquid fuel contained in the evaporation chamber is exchanged for the liquid fuel from the fuel tank. By means of this measure, "old" fuel of a preceding fractionating operation is exchanged for "fresh" fuel from the fuel tank, so that the fresh fuel has as high a proportion of the fuel fraction to be fractionated as possible for the following fractionating operation.

It is also possible to vent the condensation chamber before the fractionating operation. By means of this venting, air which has collected in the condensation chamber, that is in the accumulator, is drawn off and replaced by a gaseous fuel fraction. The effectiveness of the fractionating operation is increased as a result.

In an alternative embodiment of the method, liquid is taken from the bottom of the storage tank in a certain amount or for a certain amount or for a certain time before the fuel fraction is supplied to the engine. In this way, condensed water which may have formed in the storage tank and collected at the bottom thereof is removed before fuel injection is initiated. As a result, the admission of condensed water to the internal combustion engine is avoided.

For improving the processing of the fuel, a gaseous fluid may be introduced into liquid fuel in the form of small bubbles during the fractionating of the fuel. This improves the efficiency of the fractionating process.

Preferred embodiments of the invention will be described below in greater detail on the basis of the accompanying drawings.

Preferred exemplary embodiments of the invention are shown in the drawings and explained in more detail in the following description.

DESCRIPTION OF PREFERRED EMBODIMENTS

Figure 1:
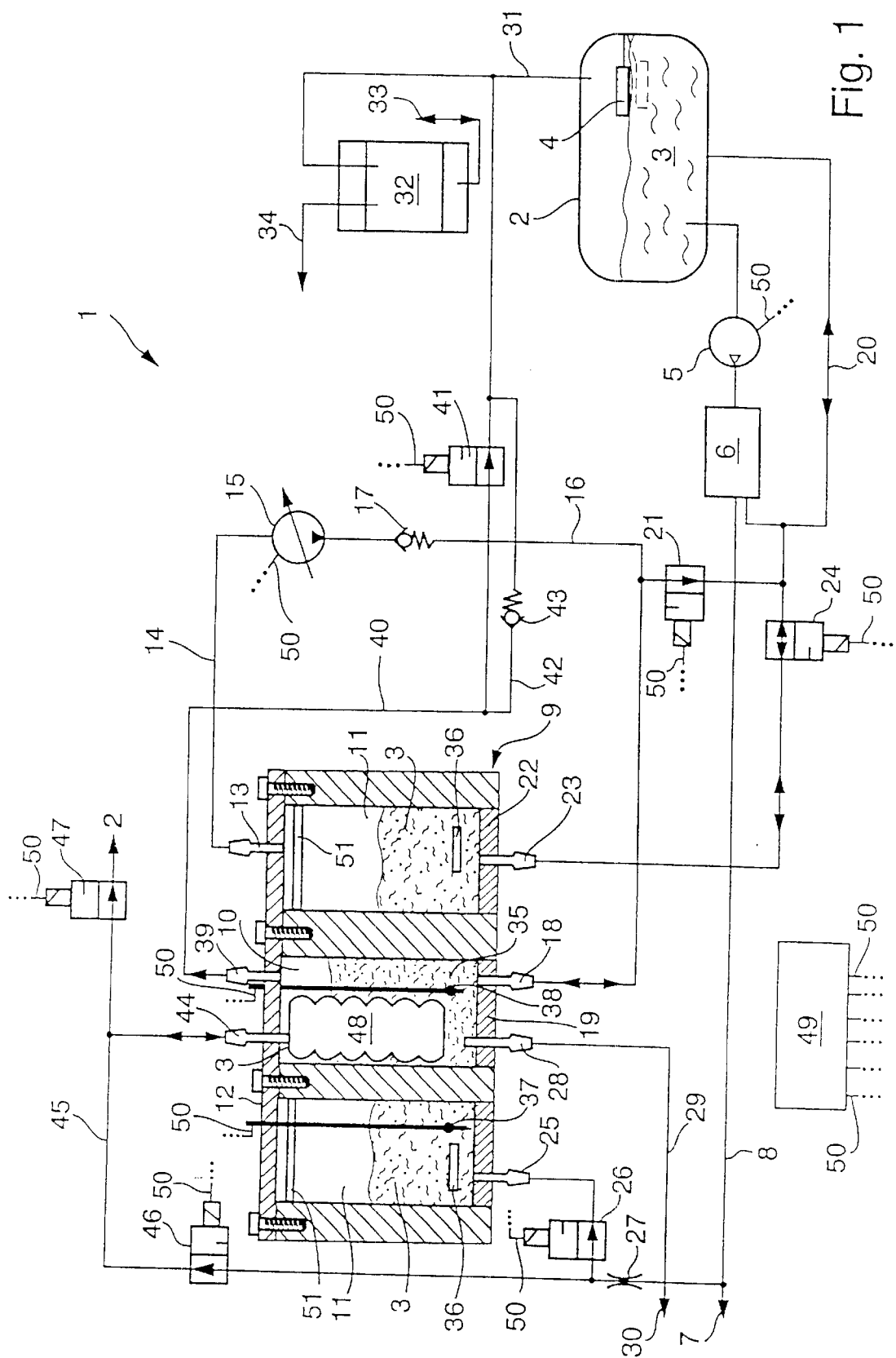
FIG. 1 shows a circuit-diagram-like diagrammatic representation of a fuel supply system according to the invention in a first embodiment.

As shown in FIG. 1, a fuel supply system 1 according to the invention has a fuel tank 2 in which there is a liquid fuel 3, e.g. Diesel fuel or gasoline. Provided in the fuel tank 2 is a float 4, with which the filling level of the tank 2 is monitored.

Venting is provided for the fuel tank 2, for which purpose a vent line 31 opens above the fuel level into the tank 2 and communicates with the environment at 33 via an activated carbon filter 32. To regenerate the activated carbon filter 32, air for the internal combustion engine may be inducted, at least briefly, through the activated carbon filter 32; a corresponding air intake line is designated by 34.

A fuel pump 5 is connected on the suction side to the tank 2 and draws in the fuel 3. On its pressure side, the fuel pump 5 delivers the fuel 3 through a filter 6 and makes the fuel 3 available to an internal combustion engine (not shown) at 7 via a fuel line 8.

A proportion of the fuel 3 pumped by the fuel pump 5, which proportion is not required by the internal combustion engine, can pass through a return line 20 downstream of the filter 6 back into the tank 2 again.

In addition, the fuel supply system 1 includes a fuel-processing device 9 which has a cylindrical condensation chamber 10 which is arranged coaxially and concentrically to an evaporation chamber 11 similarly surrounding the latter.

Unlike conventional evaporation chambers 10, which are designed only for relatively low condensation pressures, the condensation chamber 10 according to the invention is designed for a relatively high injection pressure. In addition, the condensation chamber 10 in the invention serves at the same time as an accumulator for the fuel fraction 35, so that in the present invention the terms "condensation chamber", "accumulator", "pressure accumulator" are interchangeable and are in each case provided with the reference numeral 10.

The evaporation chamber 11 and the condensation chamber 10 are closed in a gas-tight manner by a common lid 12. In the lid 12, the evaporation chamber 11 has an intake connection 13, which is connected by means of a line 14 to the suction side of a vapor pump 15. The pressure side of latter, via a line 16 in which a non-return valve 17 is arranged, is connected to a connection 18, which is formed in a bottom 19 of the condensation chamber 10. The line 16 communicates with the fuel return line 20 via a valve 21.

Figure 3:
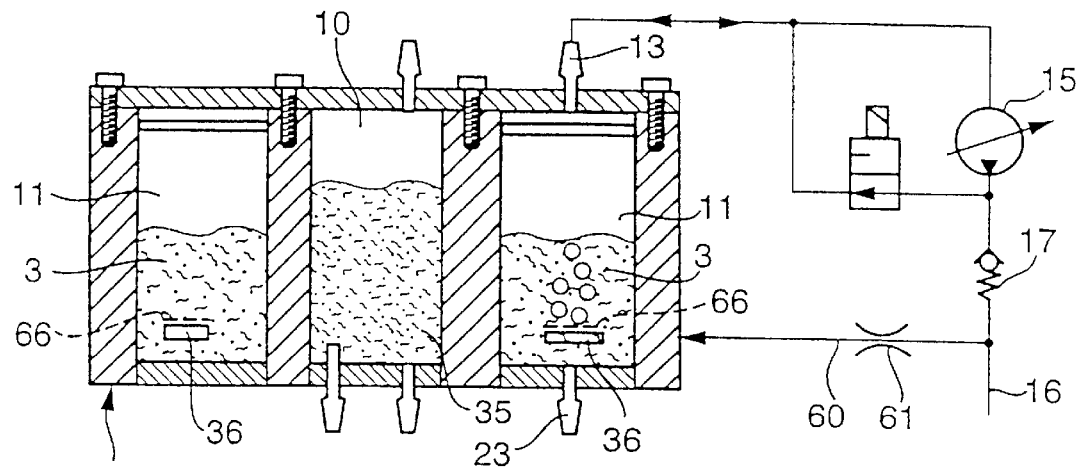
FIG. 3 shows a diagrammatic representation of a fuel-fractionating device as used in the fuel supply system according to the invention, but of a special embodiment.

The evaporation chamber 11 contains some of the fuel 3 from the tank 2, whereas the condensation chamber 10 contains a fuel fraction 35 produced by the fuel-processing device 9. In addition, a boiling intensification means 36, which is immersed completely in the liquid fuel 3 and is described in more detail further below with reference to FIG. 3, is arranged in the evaporation chamber 11. The evaporation chamber 11 also contains a level sensor 37 for detecting the fuel level in the evaporation chamber 11. The condensation chamber 10 likewise contains a level sensor 38, which senses the level of the fuel fraction 35 in the condensation chamber 10.

Formed in a bottom 22 of the evaporation chamber 11 is a connection 23, which is connected to the fuel return line 20 via a valve 24. In addition, a further connection 25 is arranged in the bottom 22 of the evaporation chamber 11, this connection 25 being connected via a valve 26 and a via a throttle 27 to the fuel line 8 and thus to the pressure side of the fuel pump 5.

Formed in the bottom 19 of the condensation chamber 10 is a connection 28 which projects from the bottom 19 into the condensation chamber 10. The opening of the connection 28 is disposed at a higher level than the opening of the connection 18, which is disposed flush with the bottom 19. The connection 28 makes the fuel fraction available to the internal combustion engine at 30 via a fuel line 29. It is clear that both lines 7 and 30 communicate with corresponding valve means, which enable the internal combustion engine to be supplied with the fuel 3 and/or with the fuel fraction from the condensation chamber 10.

The condensation chamber 10 has a connection 39, which is formed in the lid 12 and is connected to the vent line 31 via a line 40, in which a valve 41 is arranged. In addition, the line 40 contains a bypass 42, which bypasses the valve 41 and contains a non-return valve 43. The condensation chamber 10 furthermore contains another connection 44 which is likewise formed in the lid 12 and which, on the one hand, by means of a line 45, via a valve 46, communicates with the fuel line 8 and thus with the pressure side of the fuel pump 5 and, on the other hand, communicates with the fuel tank 2 via a valve 47. In the interior of the condensation chamber 10, the connection 44 opens out in a bellows 48, which can expand in the condensation chamber 10.

Furthermore, a control 49 is provided which is connected via signal and/or control lines 50 to the individual components of the fuel supply system 1, such as fuel pump, valves and sensors for example, and serves to actuate the individual components of the fuel supply system 1. The lines 50 are merely indicated in the figures for the sake of clarity.

The arrangement shown in FIG. 1 works as follows:

The fuel supply system 1 as shown is suitable, in an especially effective manner, to form a low-boiling fuel fraction 35, which can be advantageously used during start-up operation of the internal combustion engine. When a starter of the internal combustion engine is actuated, the fuel pump 5 is switched on at the same time and the valve 46 is opened. Since the valve 47 is closed and no fuel can flow off at 7 during the starting operation, the bellows 48 is filled with the fuel 3 and expands until a pressure equilibrium has formed in the condensation chamber 10 or until the bellows 48 comes to bear against a mechanical stop. Such a stop may be formed, for example, by the connection 28 which projects into the condensation chamber 10 and which then interacts with the bottom of the bellows 48. As soon as the pressure equilibrium between bellows 48 and condensation space 10 has occurred, the pressure produced by the fuel pump 5, namely the injection pressure, consequently prevails in the fuel fraction 35. In this way, an additional fuel pump, which brings the fuel fraction 35 to the injection pressure is not needed.

In a preferred embodiment, the bellows 48 and the mechanical stop interacting with it, that is, in particular, the connection 28, are designed as an electrical contact. Normally, the level in the accumulator 10 is controlled with the continuously measuring level sensor 38, so that, if the fuel level is sufficient, the bellows 48 does not come into contact with its stop. However, should the bellows 48 come into contact with its stop, so that the electrical connection is closed, this indicates a malfunction; e.g. there is not enough fuel 3 in the fuel tank 2 or the fuel 3 does not contain sufficient amounts of the low boiling fuel fraction 35 to be separated from the fuel 3.

Once the injection pressure has been built up in the fuel fraction 35, the valve 21 opens briefly, so that, from the bottom 19 of the accumulator 10, liquid can be returned from the accumulator 10 into the return line 20 and thus into the fuel tank 2. In this way, it is possible for condensation water possibly collecting at the bottom 19 of the accumulator 10 to be discharged from the accumulator 10. This prevents condensation water from being fed through the connection 28 to the internal combustion engine.

Not until after the condensation water has been drawn off are corresponding valve means opened at 30 in order to supply the internal combustion engine with the fuel fraction 35 for starting.

As soon as the starting or the run-up phase of the internal combustion engine has been completed, the valve 46 is closed and the valve 47 is opened, so that the fuel 3 contained in the bellows 48 can flow back into the tank 2. At the same time, the pressure in the accumulator 10 drops down to the thermodynamic equilibrium, so that in this way the pumping capacity required for the fractionating is kept low.

When the bellows 48 is depressurized, the vapor pump 15 is switched on for a predetermined period and, at the same time, the valve 41 is opened. In this way, a vacuum can be generated in the evaporation chamber 11.

After this vacuum has been generated in the evaporation chamber 11, the vapor pump 15 is switched off again and the valve 41 closed. Instead, the valve 24 is now opened. In this way, the vacuum formed in the evaporation chamber 11 causes fuel 3 to be drawn from the fuel tank 2 via the return line 20 into the evaporation chamber 11 until a pressure balance also occurs here. This can ensure that sufficient vapor space is retained for the subsequent fractionating. In the process, the level sensor 37 monitors the fuel level in the evaporation chamber 11.

During the filling of the evaporation chamber 11 with fuel 3, it may be expedient to carry out a flushing operation before fractionating in order to ensure that a sufficiently high proportion of low-boiling components is contained in the fuel 3 in the evaporation chamber 11. For this purpose, the valve 26 is additionally opened, so that, from the pressure side of the fuel pump 5, fuel 3 enters the evaporation chamber 11 from the fuel line 8 via the throttle 27, the valve 26 and the connection 25, while at the same time fuel 3 is returned at another point through the connection 23, the valve 24 and the return line 20 into the tank 2. This can ensure that the fuel 3 contained in the evaporation chamber 11 contains as high a proportion as possible of the fuel fraction 35 to be separated by the fractionating. In the process, the throttle 27 ensures that the fuel feed to the internal combustion engine is not impaired during this flushing operation. To terminate the flushing operation, the valves 24 and 26 are closed.

After the flushing, the vapor pump 15 is switched on again and the valve 41 is opened for a short time. During this time, the vapor pump 15 draws off the evaporating low-boiling fuel proportions from the evaporation chamber 11 and delivers them into the condensation chamber 10. The air still contained in the condensation chamber 10 is delivered via the open valve 41 into the vent line 31 of the fuel tank 2. After this venting of the condensation chamber 10, the valve 41 is closed and, with the vapor pump 15 running, the pressure in the condensation chamber 10 gradually increases until a thermodynamic equilibrium occurs therein and the fuel vapor condenses. The condensate of the fuel fraction 35 thus generated collects in the condensation chamber 10, the latter at the same time serving as an accumulator. The supply of the fuel fraction 35 collected in the accumulator 10 is normally sufficient for a plurality of cold starts or start-up operations. In this case, the level sensor 38 continuously measures the level. As soon as a top level mark is reached, the vapor pump 15 is switched off. The system is ready for the next starting operation.

As can be seen from this functional description, the fuel fractionating and filling of the accumulator 10 may also be carried out even when the internal combustion engine is not in operation, provided there is sufficient drive power for the fuel pump 5 and the vapor pump 15.

If the change in level per unit of time during the fractionating operation drops below a certain limit value, the control 49 recognizes from this that the proportion of low-boiling fuel components in the fuel 3 contained in the evaporation space 11 is too low. In order to increase this proportion of the desired fuel fraction 35 again, the fractionating is first of all ended or interrupted and the supply of fuel 3 in the evaporation chamber 11 is replenished and, if need be, a flushing operation is carried out. After that, the fractionating is started again or continued. If the number of these repetitions exceeds a predetermined limit value, the control 49 deduces from this that there is a system error.

If the aforementioned level mark in the accumulator 10 is exceeded at any instant, the control 49 also recognizes from this that there is a system error. For example, the level mark may be exceeded if the bellows 48 fractures.

Since the accumulator 10 or the condensation chamber 10 is surrounded by the evaporation chamber 11, a heat exchange occurs during the fractionating between the evaporation chamber 11, which cools down in the process and the condensation chamber 10, which warms up in the process. This arrangement makes it possible in principle to dispense with an additional heat supply for the evaporation of the fuel fraction 35. It is therefore possible, in particular, to also carry out the fractionating when the internal combustion engine is switched off.

The non-return valve 17 arranged in the line 16 prevents some of the fuel fraction 35 from flowing out of the accumulator 10 back into the evaporation chamber 11, in particular when the vapor pump 15 is switched off.

The non-return valve 43 arranged in the bypass 42 serves as a safety valve and prevents an inadmissibly high pressure increase in the accumulator 10.

Arranged in the evaporation chamber 11 upstream of the connection 13 is a filter 51 which is intended to prevent liquid fuel 3 from being delivered from the evaporation chamber 11 into the condensation chamber 10.

By means of the boiling intensification means 36 described further below with reference to FIG. 3, the evaporation of the low-boiling fuel fraction is simplified and the drive power requirements for the vapor pump 15 are reduced.

Figure 2:
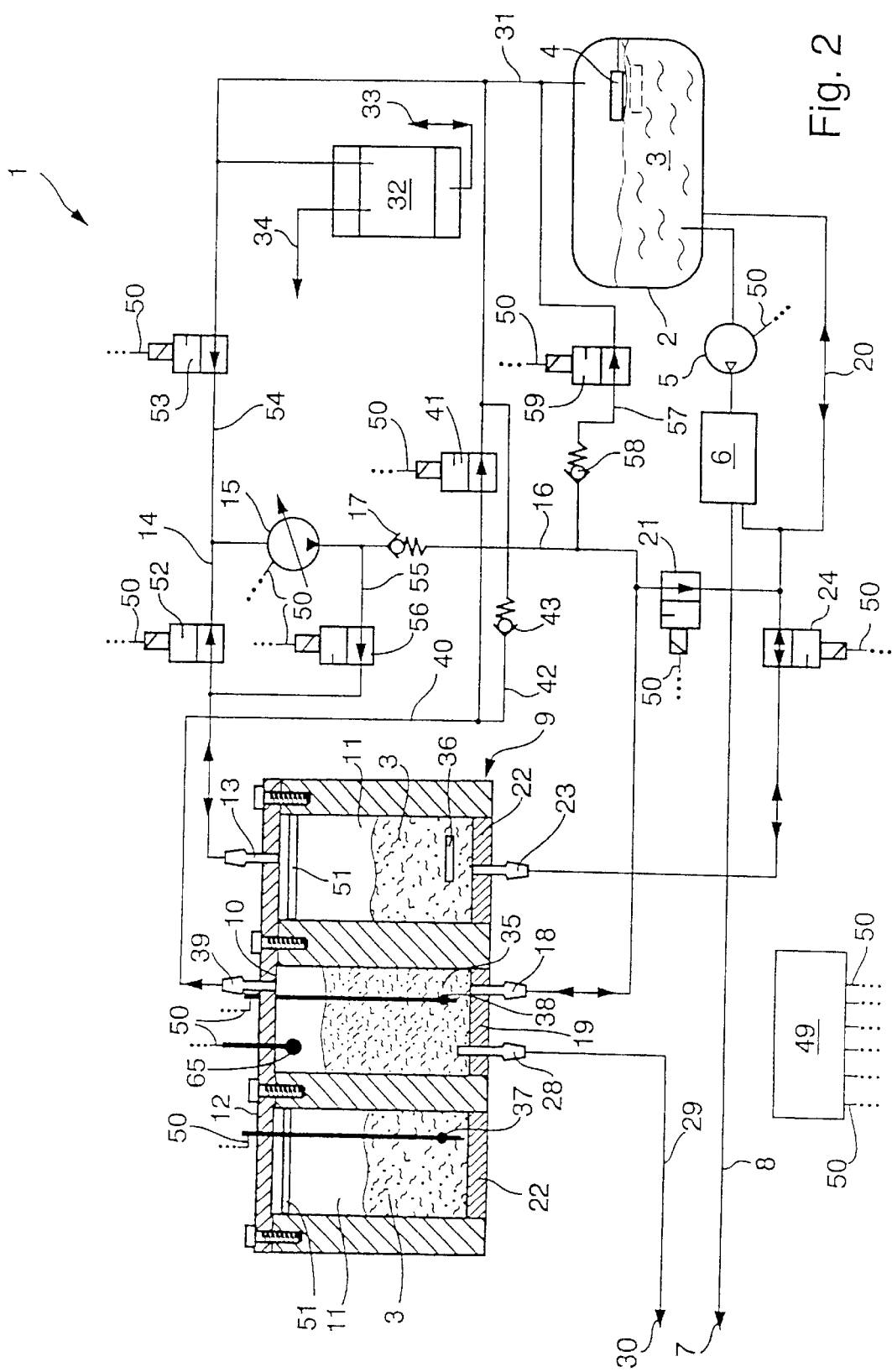
FIG. 2 shows a representation as in FIG. 1, but of a second embodiment.

The embodiment shown in FIG. 2 of a fuel supply system 1 according to the invention is constructed in largely the same way as the fuel supply system shown in FIG. 1, the same parts having the same reference numerals.

According to FIG. 2, the suction side of the vapor pump 15 in this embodiment can be connected on the one hand to the connection 13 of the evaporation chamber 11 via a valve 52 and the line 14 and on the other hand to the vent line 31 of the fuel tank 2 via a valve 53 and a line 54. In addition, a bypass line 55, in which a valve 56 is arranged, whereby the valve 52 and the vapor pump 5 can be bypassed when the valve 56 is open. Furthermore, an additional connecting line 57, in which a non-return valve 58 and a valve 59 are contained, is provided between the line 16 and the vent line 31 of the tank 2.

The pressure prevailing in the condensation chamber or accumulator 10 can be monitored here by means of a pressure sensor 65.

The system according to FIG. 2 works as follows:

When the starter of the internal combustion engine is actuated, the vapor pump 15 is switched on at the same time; in addition, the valves 59, 52, 56 and 53 are opened. As a result, the vapor pump 15 can start up in a pressureless manner. After a brief start-up phase, the valves 52 and 56 are closed, so that the vapor pump 15 draws in vaporous fuel 3 from the vent line 31 and thus from the tank 2 and draws in air from the environment 33 through the activated carbon filter 32 and directs them into the condensation chamber 10. In the process, the non-return valve 58 serves as a pressure relief valve on the pressure side of the vapor pump 15 and is set in such a way that the injection pressure builds up in the condensation chamber, i.e. the accumulator 10.

In order to remove condensation water from the accumulator 10, which condensation water may have collected at the bottom 19 of the accumulator 10, the valve 21 is briefly opened, so that liquid, in particular condensation water, is drawn off from the accumulator 10 at the bottom 19 of the latter through the connection 18 and is transported into the tank 2. After this condensation water has been drawn off, appropriate valve means are opened at 30, and the fuel fraction 35 made available there to the internal combustion engine can be fed for starting and running operation of the internal combustion engine.

When the starting and warm-up of the internal combustion engine has been completed, the valves 59 and 53 are closed, whereas the valves 52 and 41 are opened; meanwhile the vapor pump 15 continues to run. As a result, the vapor pump 15 draws off the low-boiling fuel fractions, which evaporate at the vacuum formed in the evaporation chamber 11 and which are contained the fuel 3, out of the evaporation chamber 11. The low-boiling fuel fractions are delivered by the vapor pump 15 into the condensation chamber 10. At the same time, air still present in the condensation chamber 10 together with the fuel vapor is discharged through the opened valve 41 into the vent line 31 of the fuel tank 2.

When the valve 41 is closed, the pressure increases in the condensation chamber 10 until the thermodynamic equilibrium is reached, so that the fuel vapor then condenses. The condensate which becomes the fuel fraction 35 collects in the condensation chamber 10, which in this case is at the same time used as accumulator 10. In the process, the level sensor 38 continuously monitors the level.

As soon as a top level mark in the accumulator 10 is reached, the valves 56, 53 and 24 are opened, the vapor pump 15 continuing to run. In this operating state, the fuel 3 which is stored in the evaporation chamber 11 and in which the higher-boiling fractions have been enriched due to the extraction of the low-boiling components, is returned into the fuel tank 2.

When the evaporation chamber 11 has been completely emptied, the valves 56 and 53 are closed, and the valves 52 and 59 are opened, in which case the vapor pump 15 continues to run and the valve 24 remain open. With this operating position, the evaporation chamber 11 is filled with fuel 3 again from the fuel tank 2.

As soon as the top level mark of the evaporation chamber 11 as monitored by the level sensor 37, has been reached, the vapor pump 15 is switched off and the valves 52, 59 and 24 are closed.

If the change in level per unit of time in the accumulator 10 during the fractionating drops below a certain limit level, this is an indication for the control 49 that the proportion of low-boiling fuel components in the fuel 3 stored in the evaporation chamber 11 is too low. The control 49 then carries out the emptying and refilling procedure of the evaporation chamber 11 in order thus to replace the fuel 3 in the evaporation chamber 11 with "fresh" fuel from the fuel tank 2. If the number of such exchange operations exceeds a predetermined limit value, the control 49 recognizes a system error.

The functioning of the boiling intensification means 36 is explained with reference to FIG. 3. In accordance with the left-hand half of FIG. 3, such a boiling intensification means, in a first embodiment, may be formed by a body 36 with a surface structure with a large surface wetted by the fuel 3. In this case, a body 36 of such construction acts like a type of catalyst and facilitates the evaporation of the low-boiling fuel portions at the surface of the body 36. Such a boiling intensification means works in a purely passive manner and without external power.

The boiling intensification means 36 in the evaporation chamber 11 as shown in the right-hand half of FIG. 3 is of a different type. This boiling intensification means consists of a body 36 which is made of a gas-permeable material, preferably of an open-pored or micro-porous material and to which a gaseous fluid is admitted. For this purpose, a line 60 branches off from the line 16 on the pressure side of the vapor pump 15. This line 60 contains a throttle 61 and supplies the microporous body 36 with a partial flow of the gaseous fuel fraction 35 drawn off from the evaporation chamber 11. In particular when the drawn-off fuel fraction on the pressure side of the vapor pump 15 is liquefied by the high pressure prevailing there, the fuel fraction is again evaporated by means of the throttle 61. The quantity extracted for this purpose on the pressure side of the vapor pump 15 is relatively small and has only a marginal effect on the delivery capacity of the vapor pump 15. The gas bubbles rising in the fuel 3 are suitable in a special manner for dissolving further low-boiling fuel proportions out of the fuel 3. Such a boiling intensification means works in an active manner and requires external power.

In addition, or alternatively, the bodies 36 may be provided with heating means 66. For example, the bodies 36 may be provided with semiconductor resistance heating (PTC heating) The tendency of the low-boiling fuel components to boil is intensified by the heating of the fuel 3.

Figure 4:
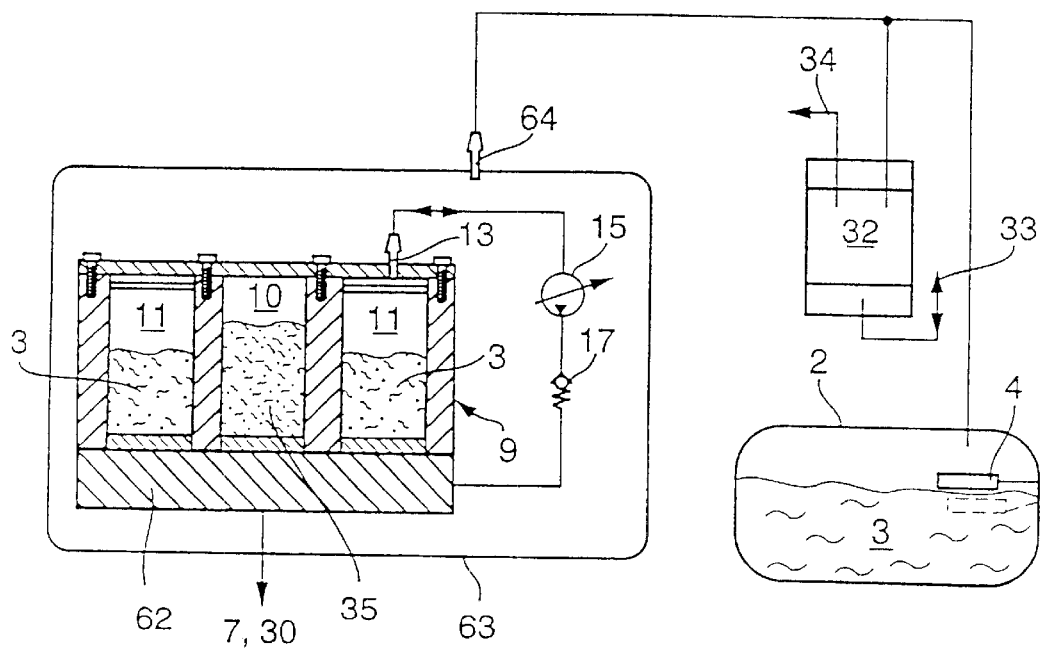
FIG. 4 shows a view as in FIGS. 1 and 2, but of another embodiment.

According to FIG. 4, most of the connections to the evaporation chamber 11 and to the condensation chamber 10 may be integrated in a valve plate 62 at the underside of the chambers 10 and 11, which results in an especially compact design for the fuel-processing device 9. In addition, a pre-assembled module can be provided in this way.

In addition, a further improvement for such a fuel-processing device 9 is shown in FIG. 4. Here, most of the fluid-conducting components of the fuel-fractionating device 9 are accommodated inside a protective housing 63 which is sealed with regard to liquid and gaseous fuels. In this case, venting can take place by venting the protective housing 63 to by the activated carbon filter 32 via a connection 64.

In an especially advantageous embodiment, it is proposed to arrange all or most of the liquid-conducting components of the fuel-processing device 9 in the fuel tank 2. The tank housing then forms the aforesaid protective housing 63.

What is claimed is:

1. A fuel supply system for an internal combustion engine, having a fuel tank for liquid fuel, a fuel pump for withdrawing fuel from the fuel tank and pressurizing the fuel to an injection pressure for supply to the internal combustion engine, a fuel processing device which produces at least one liquid fuel fraction from the fuel, and an accumulator to which the liquid fuel fraction from the fuel-processing device is supplied to be stored therein and from which it is made available to the internal combustion engine by the fuel supply system as a function of demand, and pressure generating means for the fuel fraction in the pressure accumulator, said pressure-generating means comprising a bellows arranged in the pressure accumulator and a pressure source connected to the bellows supplying the injection pressure of said fuel to said bellows for pressurizing said accumulator.

2. A fuel supply system according to claim 1, wherein the pressure source is formed by the pressure side of the fuel pump and valve means are provided for controlling the applications of the injection pressure to the bellows.

3. A fuel supply system according to claim 1, wherein the fuel-processing device includes as pressure-generating means a vapor pump which is connected, at the suction side, to an evaporation chamber of said fuel processing device, wherein liquid fuel is contained and, at the pressure side, to a condensation chamber of said fuel processing device, the vapor pump being connected with its pressure side to the pressure accumulator for generating in said accumulator a fuel pressure corresponding to the fuel injection pressure.

4. A fuel supply system according to claim 3, wherein said condensation chamber forms said accumulator.

5. A fuel supply system for an internal combustion engine having a fuel tank for liquid fuel, a fuel pump for withdrawing fuel from the fuel tank and pressurizing the fuel for supplying it to the internal combustion engine, a fuel processing device which produces at least one liquid fuel fraction from the fuel and an accumulator, to which the liquid fuel fraction from the fuel processing device is supplied to be stored therein and from which it is made available to the internal combustion engine as a function of demand, said fuel processing device further including a vapor pump having a pressure side and a suction side, an evaporation chamber connected to the suction side of said vapor pump and a condensation chamber connected to the pressure side of said vapor pump, said condensation chamber being cylindrical and said evaporation chamber being annular and extending around said condensation chamber.

6. A fuel supply system according to claim 5, wherein the condensation chamber and evaporation chamber form a module which is provided with a bottom valve plate that extends across said condensation and evaporation chambers and contains valve means for operating the fuel processing device.

7. A fuel supply system according to claim 5, wherein a fluid-tight protective housing is provided in which the fluid-conducting components of the fuel-fractionating device are accommodated.

8. A fuel supply system according to claim 5, wherein at least some of the components of the fuel processing device are accommodated within the fuel tank.

9. A fuel supply system according to claim 5, wherein the accumulator includes in its bottom wall a first connection through which fluid can be extracted from the accumulator and a control is provided which extracts liquid through the first connection for a predetermined extraction time or for a predetermined liquid quantity before fuel is supplied to the internal combustion engine.

10. A fuel supply system according to claim 9, wherein a second connection is provided in the bottom of the accumulator for the removal of the fuel fraction from the accumulator said second connection having an opening disposed at a higher level than that of the first connection.

11. A fuel supply system according to claim 5, wherein the fuel-processing device includes a vapor pump with a suction side and a pressurized pump, which is connected with the suction side to the evaporation chamber and with the pressure side to the condensation chamber, and wherein boiling intensification means are arranged in the evaporation chamber.

12. A fuel supply system according to claim 11, wherein said boiling intensification means comprises a body which is immersed in the liquid fuel and has a surface structure with a larger surface area which can be wetted by the fuel.

13. A fuel supply system according to claim 11, wherein the boiling intensification means consist of a body of an open-pored, gas-permeable material which is immersed in the liquid fuel and through which a gaseous fluid is discharged into the liquid fuel to form bubbles therein.

14. A fuel supply system according to claim 13, wherein the gaseous fluid is gaseous fuel.

15. A fuel supply system according to claim 11, wherein the boiling intensification means comprises a body which is immersed in the liquid fuel and is provided with heating means, in particular with semiconductor resistance heating means.

16. A method of supplying fuel to an internal combustion engine from a fuel tank, said method comprising the steps of withdrawing liquid fuel from said fuel tank, pressurizing the fuel drawn from said tank to an injection pressure, making the fuel with said injection pressure available to the internal combustion engine, producing from said liquid fuel at least one liquid fuel fraction, collecting said fuel fraction, storing it in an accumulator, pressurizing the fuel fraction stored in the accumulator to said injection pressure and making it available from said accumulator to the internal combustion engine, and supplying the fuel made available to the internal combustion engine.

17. A method according to claim 16, wherein, before said fuel fraction is supplied to the internal combustion engine, liquid is extracted at the bottom of the accumulator for a predetermined extraction time or for a predetermined liquid quantity.

18. A method according to claim 16, wherein a gaseous fluid is directed into the liquid fuel so as to form bubbles therein in order to enhance the formation of said fuel fraction.

19. A method according to claim 18, wherein said gaseous fluid is gaseous fuel.

20. A method according to claim 16, wherein said accumulator serves as a condensation chamber of a fuel-processing device which includes a vapor pump which is connected with its suction side to an evaporation chamber containing liquid fuel and with its pressure side to said accumulator.

21. A method according to claim 20, wherein the pressure in said accumulator during the fractionating operation is smaller than the injection pressure of said fuel.

22. A method according to claim 20, wherein the evaporation chamber is filled with liquid fuel before fuel is evaporated, a vapor space sufficient for the fractionating operation being retained.

23. A method according to claim 22, wherein the evaporation chamber is filled with liquid fuel by applying a vacuum to the evaporation chamber so that fuel is drawn out of the fuel tank into the evaporation chamber, which is connected to the fuel tank.

24. A method according to claim 22, wherein, during the filling of the evaporation chamber with fuel, the liquid fuel contained in the evaporation chamber is flushed so as to be exchanged for liquid fuel from the fuel tank.

25. A method according to claim 20, wherein the accumulator is vented before the fractionating procedure.

* * * * *